United States Patent Office 3,338,480
Patented Aug. 29, 1967

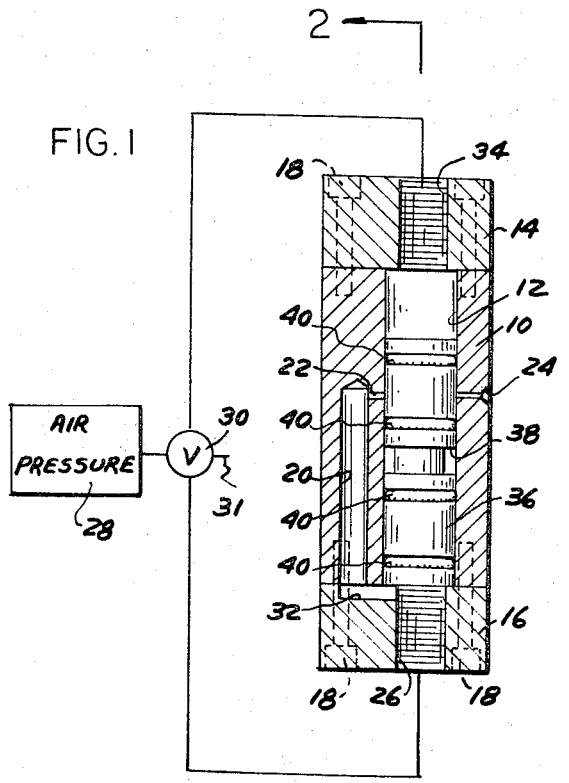

3,338,480
METERING AND DISPENSING DEVICE HAVING RECIPROCATING FLUID ACTUATING DISCHARGE MEANS
John A. Sweeney, c/o Clawson Tool Co., 1150 Naughton, Clawson, Mich. 48017
Filed Aug. 11, 1965, Ser. No. 478,890
11 Claims. (Cl. 222—334)

The present invention relates to devices for dispensing a metered quantity of a substance such as a lubricant, buffing compound or the like.

In manufacturing operations it is often desirable to periodically subject parts of the machinery to a spray of lubricant or the like. Further, where the workpiece is to be subjected to an abrasive operation such as polishing or grinding, it is necessary to periodically coat the workpiece with a buffing compound. The present invention provides an economically manufactured device for dispensing a metered quantity of such substances. Because of the low cost in replacing the device it has special utility for dispensing buffing compound and other similar substances which subject such devices to wear.

It is an object then of the present invention to reduce the cost of manufacturing operations by providing an economically manufactured device for dispensing a metered quantity of lubricant, buffing compound and other similar substances.

It is another object of the present invention to simplify the construction of metering and dispensing devices by providing such a device having an internal bore, a metering means carried in the bore, means moving the metering means intermediate two positions, means for filling the metering means with a quantity of the substance to be dispensed at one of the positions, and means dispensing the metered quantity of substance at the other position.

Still further objects and advantages of the present invention will be readily apparent to one skilled in the art to which the invention pertains upon reference to the following description. The description makes reference to the accompanying drawings in which like reference characters refer to like parts throughout the several views and in which FIG. 1 is a longitudinal cross sectional view of a preferred device with portions of the device illustrated in elevation for purposes of clarity, and illustrating diagrammatically a preferred actuating system connected with the device.

FIG. 2 is a longitudinal cross sectional view taken substantially on the line 2—2 of FIG. 1 with portions of the device illustrated in elevation for purposes of clarity and illustrating diagrammatically other elements connected to the device.

FIG. 3 is a longitudinal cross sectional view similar to FIG. 1 but illustrating the valve member of the device in another operating position, and FIG. 4 is a cross sectional view taken substantially on line 4—4 of FIG. 2.

Now referring to the drawings for a more detailed description of the present invention, a preferred embodiment thereof is illustrated as comprising a housing member 10 having an elongated cylindrical through bore 12 offset from the center of the housing 10 as can best be seen in FIG. 4. The bore 12 is closed at each end by end caps 14 and 16 which are secured to the housing 10 by screws 18.

As can best be seen in FIGS. 1, 3 and 4, the housing 10 is provided with a bore 20 which extends axially into the housing 10 from the end thereof adjacent the cap 16 and terminates short of the opposite end of the housing 10. A transverse passage 22 is provided in the housing 10 intersecting the bore 12 and registering at one end with the bore 20 near the closed end thereof and at the opposite end with an orifice 24 provided in the exterior surface of the housing 10.

The cap 16 is provided with a port 26 registering with the bore 12 and adapted for connection to a source of air pressure 28 through a valve 30 as shown diagrammatically in FIG. 1. The inner surface of the cap member 16 is provided with a groove 32 which provides communication between the port 26 and the bore 20. The cap 14 is provided with a port 34 registering with the bore 12 and adapted for connection to the source of air pressure 28 through the valve 30 again as shown diagrammatically in FIG. 1. The valve 30 is provided with an exhaust 31 so that when pressure is supplied to either the port 26 or 34 it will be simultaneously exhausted from the other port.

A cylindrical metering member 36 is axially slidably carried within the bore 12 and is of an axial length shorter than the bore 12 so that the metering member 36 is axially movable intermediate the position illustrated in FIGS. 1 and 2 and the position illustrated in FIG. 3. The metering member 36 is provided with a medial annular recess 38 and carries a pair of axially spaced O-ring seals 40 on each side of the recess 38. The passage 22 is disposed to be intermediate a pair of O-rings 40 in the position of the metering member 36 illustrated in FIGS. 1 and 2 and to register with the recess 38 in the position illustrated in FIG. 3. The housing 10 is provided with a port 42 connected with the through bore 12 by a passage 44 and adapted for connection to a reservoir 46 through a pump 48 as illustrated diagrammatically in FIG. 2. The port 42 and the passage 44 are positioned within the housing 10 to register with the recess 38 of the metering member 36 when the metering 36 is in the position illustrated in FIGS. 1 and 2 and to be disposed intermediate a pair of the O-ring seals 40 when the metering member 36 is in the position illustrated in FIG. 3.

In operation, air pressure is selectively directed through the valve 30 to either the port 34 or the port 26 and exhausted from the exhaust 31 to actuate the metering member 36 intermediate the positions illustrated in FIGS. 1 and 3. With the pressure being directed through the port 34 and exhausted through the port 26 so that the metering member 36 is in the position illustrated in FIGS. 1 and 2, the substance to be dispensed will be directed by the pump 48 from the reservoir 46 through the port 42 and the passage 44 to the recess 38 provided in the metering member 36. In this way the substance such as a lubricant or buffing compound will be stored in a metered quantity by the metering member 36. When the recess 38 has been filled, the valve member 30 will be actuated to exhaust pressure through the port 34 and direct the pressure to the port 26 to move the metering member 36 to the position illustrated in FIG. 3. In this position the passage 22 registers with the recess 38 and pressure directed through the passage 22 by the groove 32 and the bore 20 will exhaust through the orifice 24 to dispense the substance carried by the groove 38 through the orifice 24. In this way a metered quantity of the substance is dispensed from the device. The O-ring seals 40 prevent the air pressure and the substance from leaking along the outer surface of the metering member.

It is apparent that a simply constructed and economically manufactured metering and dispensing device has been described. Due to the low cost of providing the device of the present invention the device is especially useful in dispensing a metered quantity of substances such as buffing compound or the like which subject the internal workings of the device to severe abrasive action. Heretofore attempts to solve this problem have taken the form of providing means for diminishing the effect of the abrasive action. In the present device, the low cost of the conruction permits the parts for the entire device to be replaced when they become worn.

It is also apparent that although I have described but ne embodiment of my invention, many other changes nd modifications can be made therein without departing om the spirit of the invention as expressed by the appended claims.

I claim:
1. A metering and dispensing device comprising
   (a) a housing having a bore,
   (b) a metering member carried within said bore,
   (c) said member being selectively movable within said bore intermediate a first and a second position and being provided with a groove extending about the outer surface and intermediate the ends thereof, fluid pressure means connected to said bore for selectively moving said metering member between said first and second positions,
   (d) means for filling said groove with a substance at one of said positions, and
   (e) means for dispensing the substance from said groove at the other of said positions, said dispensing means comprising means connecting one side of said bore with said groove only at said second position whereby fluid pressure is directed into said groove through said connecting means at said second position.

2. The device as defined in claim 1 and in which said filling means comprises
   (a) said housing being provided with a port adapted for connection to a substance providing means, and
   (b) said housing being provided with a passage connected with said bore and disposed to register with said groove in said metering member at said first position of said metering member.

3. A metering and dispensing device comprising
   (a) a housing having a cylindrical through bore,
   (b) cap members secured to said housing and closing each end of said bore,
   (c) a cylindrical metering member axially slidably carried in said bore and having a substantially medially disposed annular groove in the exterior surface thereof,
   (d) said metering member being less in axial length than the length of said bore whereby said metering member is movable from a first position at one end of said bore to a second position at the other end of said bore,
   (e) means for selectively providing fluid pressure to said bore on opposite sides of said metering member whereby to move said metering member within said bore intermediate said first and second positions,
   (f) means for filling said groove with a substance at said first position of said metering member, and
   (g) means for dispensing the substance from said groove and from said housing at said second position of said metering member, said dispensing means comprising means connecting one side of said bore with said groove only at said second position whereby fluid pressure is directed into said groove through said connecting means at said second position.

4. The device as defined in claim 3 and in which said fluid pressure providing means comprises ports provided in said cap members and registering with the ends of said bore, said ports being adapted for connection to a fluid pressure system.

5. The device as defined in claim 3 and including O-ring seals carried by said metering member on opposite sides of said groove.

6. The device as defined in claim 5 and including second O-ring seals carried by said metering member intermediate said first mentioned O-ring seals and the ends of said metering member.

7. A metering and dispensing device comprising;
   (a) a housing having a bore,
   (b) a metering member carried within said bore,
   (c) said member being selectively movable within said bore intermediate a first and a second position and being provided with a groove intermediate the ends thereof,
   (d) means for filling said groove with a substance at one of said positions,
   (e) means for dispensing the substance from said groove at the other of said positions,
   (f) means for selectively moving said metering member intermediate said first and second positions,
   (g) said moving means comprising a source of fluid under pressure and means for selectively and alternately connecting said source of fluid pressure to said bore on opposite sides of said metering member, connecting one side of said metering member to said source of fluid pressure being operable to move said metering member to said first position and connecting the opposite side of said metering member to said source of fluid pressure being operable to move said metering member to said second position, and
   (h) said dispensing means comprising said housing being provided with a passage connected with said bore and disposed to register with said groove in said metering member at said second position of said metering member, means provided in said housing for connecting said passage with said source of fluid pressure, and said housing being provided with a discharge orifice connected with said bore and registering with said groove on said metering member at said second position of said metering member.

8. A metering and dispensing device comprising:
   (a) a housing having a bore,
   (b) a metering member carried within said bore and being provided with a groove intermediate the ends thereof,
   (c) means for selectively moving said metering member intermediate a first and second position, said meter moving means comprising a source of fluid pressure and means for selectively and alternately connecting said source of fluid pressure to said bore on opposite sides of said metering member,
   (d) means for filling said groove with a substance at one of said positions, and
   (e) said housing being provided with a passage connected with said bore and disposed to register with said groove and said metering member at one of said positions of said metering member, means for connecting said passage with said source of fluid pressure, and said housing being provided with a discharge orifice connected with said bore and disposed to register with said groove at said last mentioned position of said metering member whereby upon movement of said metering member to said last mentioned position said substance is dispensed from said groove through said discharge orifice.

9. A metering and dispensing device comprising;
   (a) a housing having a cylindrical through bore,
   (b) cap members secured to said housing and closing each end of said bore,
   (c) a cylindrical metering member axially slidably carried in said bore and having a substantially medially disposed annular groove in the exterior surface thereof,
   (d) said metering member being less in axial length than the length of said bore whereby said metering member is movable from a first position at one end of said bore to a second position at the other end of said bore,
   (e) means for selectively providing fluid pressure to said bore on opposite sides of said metering member whereby to move said metering member within said bore intermediate said first and second positions,
   (f) means for filling said groove with a substance at said first position of said metering member, (g) means for dispensing a substance from said groove and from said housing at said second position of said metering member,
(h) said fluid pressure providing means comprising ports provided in said cap members and registering with the ends of said bore, said ports being adapted for connection to a fluid pressure system,
(i) said dispensing means comprising, said housing being provided with a passage having a discharge orifice at one end and intersecting said bore, said housing and one of said cap members being provided with means communicating one of said ports with said passage, said last mentioned port being the one provided to move said metering member to said second position whereby upon fluid pressure being provided at said last mentioned port fluid pressure is also supplied to said passage, and
(j) said passage being disposed to register with said bore at a point coincident with said groove of said metering member at said second position of said metering member.

10. A metering and dispensing device comprising;
(a) a housing having a bore,
(b) a metering member carried within said bore,
(c) said member being selectively movable intermediate a first and second position and being provided with a groove intermediate the ends thereof,
(d) means for filling said groove with a substance at one of said positions,
(e) means for selectively providing fluid pressure to said bore on opposite sides of said metering member whereby to move said metering member within said bore intermediate said first and second positions,
(f) means for filling said groove with a substance at said first position of said metering member,
(g) means for dispensing the substance from said groove and from said housing at said second position of said metering member, and
(h) said dispensing means comprising said housing being provided with a passage having a discharge orifice at one end and intersecting said bore, said housing being provided with means communicating one of said ports with said passage, said last mentioned port being the one provided to move said metering member to said second position whereby upon fluid pressure being provided at said last mentioned port fluid pressure is also supplied to said passage and, said passage being disposed to register with said bore at a point coincident with said groove of said metering member at said second position of said metering member.

11. A metering and dispensing device comprising;
(a) a housing having a bore;
(b) a metering member carried within said bore;
(c) said metering member being selectively movable within said bore intermediate a first and a second position and being provided with a groove intermediate the ends thereof;
(d) means for filling said groove with a substance at said first position;
(e) means for dispensing the substance from said groove at the said second position;
(f) said housing being provided with a first passage extending beside and in the same direction as said bore and a second passage connected with said first passage and disposed to register with said groove in said metering member at said second position of said metering member;
(g) said first passage being adapted for connection to a source of fluid under pressure, and
(h) said housing being provided with a discharge orifice connected with said second passage whereby upon movement of said metering member to said second position said fluid under pressure is directed through said passage and said groove to discharge said substance through said discharge orifice.

References Cited
UNITED STATES PATENTS

| | | | |
|---|---|---|---|
| 1,274,212 | 7/1918 | Thompson | 222/234 X |
| 2,253,785 | 8/1941 | Hillis | 222—250 X |
| 2,840,276 | 6/1958 | Dreyer et al. | 222—234 X |
| 2,885,029 | 5/1959 | Burrell | 222—249 X |
| 3,161,274 | 12/1964 | Lanz | 221—278 X |
| 3,163,324 | 12/1964 | Lupo | 221—278 X |
| 3,190,504 | 6/1965 | Laver | 222—250 X |
| 3,207,367 | 9/1965 | Anderson | 222—250 X |

WALTER SOBIN, *Primary Examiner.*